United States Patent
McCaskill et al.

(10) Patent No.: US 7,678,990 B2
(45) Date of Patent: *Mar. 16, 2010

(54) FLEXIBLE INTEGRATED PHOTOVOLTAIC ROOFING MEMBRANE AND RELATED METHODS OF MANUFACTURING SAME

(75) Inventors: John R. McCaskill, McKinney, TX (US); C. Daniel Maytubby, Frisco, TX (US)

(73) Assignee: Elk Premium Building Products, Inc., Dallas, TX (US)

( * ) Notice: Subject to any disclaimer, the term of this patent is extended or adjusted under 35 U.S.C. 154(b) by 847 days.

This patent is subject to a terminal disclaimer.

(21) Appl. No.: 11/051,053

(22) Filed: Feb. 4, 2005

(65) Prior Publication Data

US 2005/0178429 A1 Aug. 18, 2005

Related U.S. Application Data

(60) Provisional application No. 60/545,016, filed on Feb. 17, 2004.

(51) Int. Cl.
*H02N 6/00* (2006.01)
(52) U.S. Cl. .................... 136/244; 136/251
(58) Field of Classification Search .......... 136/243–265
See application file for complete search history.

(56) References Cited

U.S. PATENT DOCUMENTS

| | | | |
|---|---|---|---|
| 3,459,597 A * | 8/1969 | Baron | 136/244 |
| 4,321,416 A * | 3/1982 | Tennant | 136/244 |
| 4,574,160 A | 3/1986 | Cull et al. | |
| 4,691,076 A * | 9/1987 | Levine et al. | 136/250 |
| 4,860,509 A | 8/1989 | Laaly et al. | |
| 5,437,735 A | 8/1995 | Younan et al. | |
| 5,590,495 A | 1/1997 | Bressler et al. | |
| 5,990,414 A | 11/1999 | Posnansky | |
| 6,050,042 A | 4/2000 | Durachko | |
| 6,553,729 B1 | 4/2003 | Nath et al. | |
| 6,675,580 B2 | 1/2004 | Ansley et al. | |
| 6,729,081 B2 | 5/2004 | Nath et al. | |
| 6,730,841 B2 | 5/2004 | Heckeroth | |
| 2001/0054262 A1 | 12/2001 | Nath et al. | |
| 2003/0163964 A1 | 9/2003 | Elliott | |
| 2003/0217768 A1 | 11/2003 | Guha | |
| 2004/0144043 A1 | 7/2004 | Stevenson et al. | |

* cited by examiner

*Primary Examiner*—Jennifer K Michener
*Assistant Examiner*—Miriam Berdichevsky
(74) *Attorney, Agent, or Firm*—Baker & McKenzie LLP (57) ABSTRACT

Disclosed herein are flexible, solar powered photovoltaic (PV) integrated roofing membrane and related methods of manufacturing such a membrane. The disclosed membrane and methods beneficially provide solar power to structures in either off-grid or on-grid connections. The roofing membrane may comprise multiple membrane strips or members having electrically interconnected photovoltaic solar elements. The membrane members preferably have distinct patterns for the solar elements located thereon that provide for coverage of entire sections, upon installation, as well as accommodate interconnections between the solar elements. Moreover, the membrane will appreciate the numerous types of patterns to achieve such purposed of full coverage and electrical coupling.

26 Claims, 4 Drawing Sheets

FLEXIBLE INTEGRATED PHOTOVOLTAIC ROOFING MEMBRANE AND RELATED METHODS OF MANUFACTURING SAME

CROSS-REFERENCE TO RELATED APPLICATION

This Application claims the benefit of U.S. Provisional Application Ser. No. 60/545,016, filed on Feb. 17, 2004, and entitled "Integrated Photovoltaic Roofing Membrane and Related Methods of Manufacturing Same," which is commonly assigned with the present application and incorporated herein by reference for all purposes. In addition, this Application is also related to co-pending U.S. patent application Ser. No. 11/051,839 entitled "Rigid Integrated Photovoltaic Roofing Membrane and Related Methods of Manufacturing Same," filed on Feb. 4, 2005, which is commonly assigned with the present Application.

TECHNICAL FIELD

Disclosed embodiments herein relate generally to building materials for covering, for example, the roof deck of a building, and more particularly to a flexible integrated photovoltaic roofing membrane for use on the roof deck. Such membrane may comprise overlapping membrane members each having integrated and electrically interconnected photovoltaic solar elements, and each having integrated electrical connections for electrically coupling multiple membrane members when overlapping.

BACKGROUND

The presence and use of electricity is an everyday necessity that every modern home and business enjoys. Equally enduring is the periodic cost of that electricity, based on the amount, typically in kilo-watt/hours (kwh), used at the specific location. Efforts to combat the ever-present high-cost of electricity in homes and businesses have explored a number of different avenues. For example, in the general consumer market (e.g., residences) solar power as a replacement for electricity provided by typical utility companies has been attempted relatively unsuccessfully in so-called "off-grid" connections. Such off-grid connections embody the use of solar power in lieu of conventional in-home electricity.

Whether it be the initial costs associated with such off-grid systems or the relatively difficult and costly maintenance required, off-grid systems have typically not been accepted by the consumer market. As a result, the use of solar power to supplement, rather than replace, conventional electricity has continued to gain acceptance. These so-called "on-grid" systems typically work in conjunction with conventional electrical connections to supplement that electrical power, for example, during times of peak use. By supplementing conventionally available electricity, the overall annual cost of residential (or commercial) electricity may be substantially reduced.

Conventional residential solar-powered on-grid systems are typically incorporated into the roof of a house, due to its orientation towards the sky. Earlier systems employed large, flat crystal solar panels dispersed across the surface of the roof to collect the solar energy. However, the fragility and high cost of the crystal materials, as well as the clearly distinguishable appearance of the panels from ordinary roofing shingles, has resulted in essentially a rejection of such system by the market place.

Modern systems have developed members of solar shingles that are more durable and predominantly resemble ordinary roofing shingles, thus substantially concealing the system from plain view. Unfortunately, even such modern systems suffer from deficiencies, such as the need to form multiple holes through the roof deck and into the attic area for each shingle member in order to electrically connect all of the shingle members to create a functional system. As the number of holes formed through the roof deck increases, so too do the chances of leakage through the roof during inclement weather. Moreover, making the electrical connections from one shingle member to the next, and then to the circuit breaker box of the home, is typically quite tedious and exhausting.

In addition, because the shingle members replace the ordinary shingles typically used on roofs, an experienced or specifically skilled installer is typically needed to properly align and electrically interconnect the solar shingle members during installation, just as with ordinary shingles, so that the aesthetics of the entire roof are preserved. Even so, panels located in the middle of a roofing section tend to be aesthetically unpleasing as they detract from the section's homogeneous and symmetrical appearance. As a result, a relatively inexpensive and residentially available solar-powered system is needed that does not suffer from these deficiencies.

BRIEF SUMMARY

Disclosed herein are flexible solar powered photovoltaic (PV) integrated roofing membrane and related methods of manufacturing such a membrane. The disclosed membrane and methods beneficially provide solar power to structures in either off-grid or on-grid connections. The roofing membrane may comprise multiple membrane strips or members having electrically interconnected photovoltaic solar elements. The membrane members preferably have distinct patterns for the solar elements located thereon that provide for coverage of entire sections, upon installation, as well as accommodate interconnections between the solar elements. Moreover, the membrane will appreciate the numerous types of patterns to achieve such purposed of full coverage and electrical coupling.

In one embodiment, the roofing membrane includes a flexible first membrane member having a first main body and one or more extending portions coupled to and extending therefrom, and a flexible second membrane member having a second main body. In addition, the roofing membrane in this embodiment also includes a plurality of electrically interconnected flexible photovoltaic solar elements dispersed on a top surface of the first and second main bodies and on the extending portions. The first and second members are then coupled together with the extending portions mounted on void areas (i.e., free of photovoltaic solar elements) of the top surface of the second member. In addition, in this embodiment, at least one of the first member or second member is comprised of a material having adhesive properties, for example, a bituminous material.

In a related embodiment, the roofing membrane further includes at least one underside electrical interconnect electrically coupled to and extending from an underside of one of the solar elements dispersed on the one or more extending portions, and at least one topside electrical interconnect extending from corresponding void areas of the second main body free of solar elements. As such, the at least one topside electrical interconnect is electrically coupled to at least one of the solar elements dispersed on the second portion, wherein each of the extending portions is coupled to and overlapping the corresponding void areas free of solar elements, and wherein each of the at least one underside interconnects is electrically coupled to corresponding ones of the at least one topside electrical interconnects.

In another aspect, methods of manufacturing a roofing membrane are provided. In one embodiment, a method includes forming a flexible first member having a first main body and one or more extending portions coupled to and extending therefrom, and forming a flexible second member having a second main body. The method also includes dispersing a plurality of electrically interconnected flexible photovoltaic solar elements on a top surface of the first and second main bodies and on the extending portions. The method further includes overlapping each of the extending portions of the first member over corresponding void areas on the second main body free of photovoltaic solar elements, wherein at least one of the first member or second member is formed using a material having adhesive properties.

In a related embodiment, the method further includes electrically coupling at least one underside electrical interconnect to and extending from an underside of one of the photovoltaic solar elements dispersed on the one or more extending portions. Also, the method includes electrically coupling at least one topside electrical interconnect to at least one of the photovoltaic solar elements dispersed on the second main body, where the at least one topside electrical interconnect extends from void areas of the second main body free of photovoltaic solar elements. Also in such an embodiment, the overlapping of each of the extending portions of the first member over corresponding void areas on the second main body is done such that each of the at least one underside interconnects is electrically coupled to corresponding ones of the at least one topside electrical interconnects.

In an advantageous embodiment, the roofing membrane is for use on a roof deck as a replacement for typical asphalt shingles. In a specific embodiment, the solar elements on the roofing membrane comprise photoelectric silicon spheres as the solar-powered electricity-generating cells. While functioning to convert the solar energy into electricity, the solar elements, which preferably comprise silicon spheres, may be selected so as to appear substantially similar in texture and color to the granules typically found on the exterior of conventional asphalt-based shingles. Of course, any number of variations are possible without departing from the scope of coverage found in this disclosure.

BRIEF DESCRIPTION OF THE DRAWINGS

Reference is now made to the following detailed description of the preferred embodiments, taken in conjunction with the accompanying drawings. It is emphasized that various features may not be drawn to scale. In fact, the dimensions of various features may be arbitrarily increased or reduced for clarity of discussion. In addition, it is emphasized that some components may not be illustrated for clarity of discussion. Reference is now made to the following descriptions taken in conjunction with the accompanying drawings, in which.

DETAILED DESCRIPTION OF PREFERRED EMBODIMENTS

Figure 1:
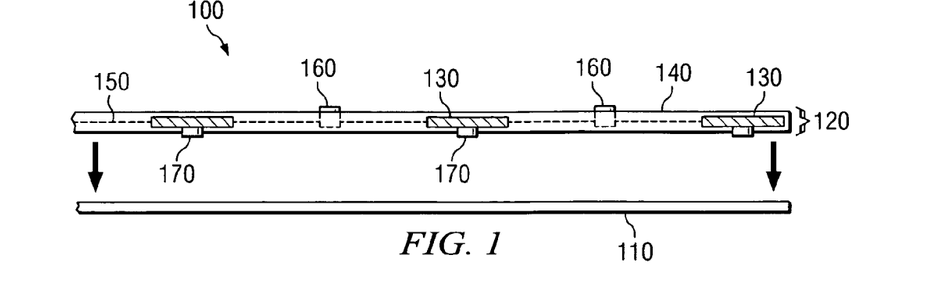
FIG. 1 illustrates is a side section view of one embodiment of an integrated photovoltaic roofing membrane constructed according to the principles disclosed herein.

Referring initially to FIG. 1, illustrated is a side section view of one embodiment of an integrated photovoltaic roofing membrane 100 constructed according to the principles disclosed herein. As illustrated, the membrane 100 includes an underlayment layer 110 and a photovoltaic upper layer 120. In one embodiment, the underlayment 110 is a bituminous-based layer or fabric having the characteristics typically associated with roofing felts and other underlying layers of conventional roofing materials. In one example, the underlayment 110 may include Styrene-Butadiene-Styrene (SBS) or Atactic Polypropylene (APP), however it should be understood that the underlayment 110 is not limited to any particular composition.

Figure 2:
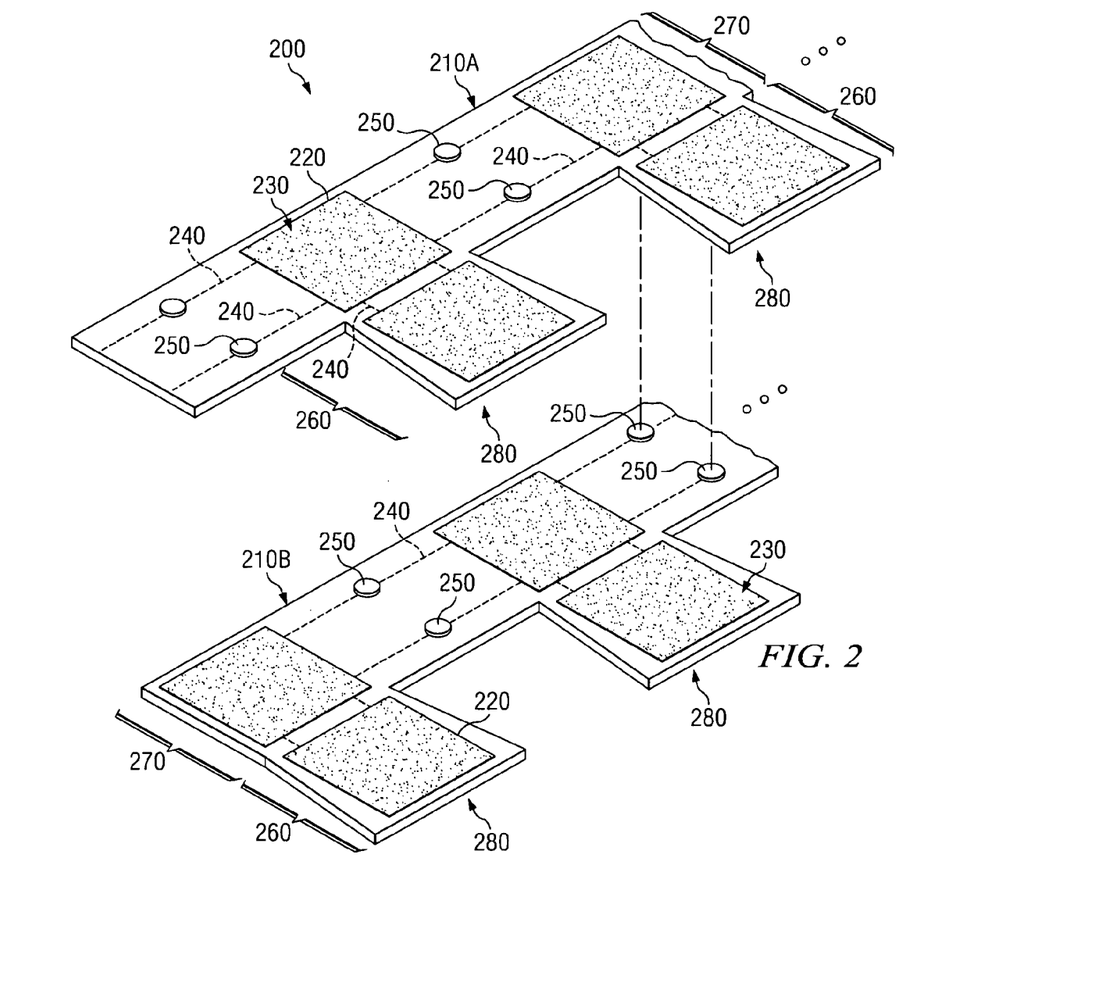
FIG. 2 illustrates an isometric exploded view of two membrane members of another embodiment of an integrated photovoltaic roofing membrane.

The upper layer 120 of the membrane 100 is comprised of several parts. Initially, the upper layer 120 includes several photovoltaic solar elements 130 dispersed horizontally across the layer 120. The solar elements 130 function as solar panels to collect solar radiation and convert it into electricity typically for use by the structure on which the membrane 100 is installed. The solar elements 130 may be formed in any shape, such as the illustrated rectangular shape, and may vary depending on the shape and size of the upper layer 120. A rectangular or square shape is often preferred for the solar elements 130 when the upper layer 120 is formed in a "dragons tooth" shape (as illustrated in FIG. 2), since more surface area of the upper layer 120 may be occupied with solar elements 130. In addition, since conventional shingles typically have a square or rectangular appearance when installed, the rectangular or square shape of the solar elements 130 allows the membrane 100 to more easily blend in appearance with conventional roofing shingles when installed, as discussed in greater detail below.

Also included in the upper layer 120 is a laminate layer 140. As shown, the laminate layer 140 may be formed over the solar elements 130 to secure the location of each element 130 with respect to one another. In addition, the laminate layer 140 is employed to secure the solar elements 130 to the underlayment 110, as well as to provide a protective, yet translucent, coating over the elements 130. The solar elements 130 are also electrically interconnected to each other within the upper layer 120. Such electrical interconnections may be made using conductive traces 150 dispersed throughout the laminate layer 140 and between the numerous solar elements 130. Advantageously, the conductive traces 150 allow all of the solar elements 130 to be electrically interconnected in a series or parallel fashion, depending on the desired power requirements and application for the membrane 100.

Also illustrated in FIG. 1 are topside electrical interconnects 160. As illustrated, the topside interconnects 160 are electrically associated with the conductive traces 150 dispersed within or beneath the laminate layer 140. Moreover, the topside interconnects 160 extend vertically in a direction opposite the underlayment 110, and out of the upper surface of the laminate layer 140 to provide the opportunity for an electrical interconnection with another member of the membrane 100 mounted immediately above the member illustrated in FIG. 1. Also shown are underside electrical interconnects 170, which extend out of the bottom surface of the upper layer 120 to provide the opportunity for an electrical connection to another member of the membrane 100 arranged beneath the illustrated member. By extending upwards and downwards out of the laminate layer 140, electrical connections between the illustrated membrane member and another membrane member of the membrane 100 may be made. More specifically, such connections may be made by simply placing the other members immediately over and under the upper layer 120, and aligning the interconnects 160, 170 with other interconnects extending from the other members (see FIG. 2).

Finally, in many embodiments, the underlayment 110 includes some type of adhesive properties on its upper and lower surfaces. For example, the adhesive may be applied or may simply be included in a mixture of bituminous-based material used to form the underlayment 110. By including such an adhesive on its upper surface or by having the material comprising the underlayment be self-adhesive, the underlayment 110 may easily be adhered to the underside of the upper layer 120 to form a single, assembled member of the membrane 100. Also, by having the lower surface of the underlayment 110 be adhesive, by whatever means, the entire assembly may easily be affixed to the roof deck of a building or other structure during installation. Moreover, when the underlayment 110 is constructed of a bituminous-based material having such an adhesive property, the membrane 100 will typically have better longevity in adhering to the roof deck as the bituminous material continues to react to extreme temperatures over time. Furthermore, the malleable nature of a bituminous underlayment 110 results in a membrane 100 that is often "self-healing" in that punctures therethrough typically seal together as the underlayment 110 reacts (e.g., "melts") with increased temperatures.

Turning now to FIG. 2, illustrated is an isometric exploded view of two members of another embodiment of an integrated photovoltaic roofing membrane 200. Specifically, this embodiment illustrates a first member 210A to be mounted partially over a second member 210B of the membrane 200. As with the embodiment in FIG. 1, both the first and second members 210A, 210B include photovoltaic solar elements 220 horizontally arranged in a predetermined fashion across the first and second members 210A, 210B, along with "void" areas not including any solar elements.

In a specific embodiment, the solar elements 220 are comprised of any type of photoelectric material capable of use in a solar-powered electrical system. For example, the solar elements 220 may be solar panels based on thin films, or even conventional crystalline silicon solar panels. In another exemplary embodiment, the solar elements 220 may be constructed from photoelectric silicon spheres 230 formed on an aluminum base or frame. Examples of such spherical photoelectric systems are produced by Spheral Solar Power, Inc. of Cambridge, Ontario, Canada. Of course, a solar-powered system constructed as described herein is not limited to the use of spherical solar panels, and may employ any type of solar panel either now existing or later developed.

One advantage to the use of spherical solar panels is the aesthetic value provided by this relatively new technology. For example, as shown in FIG. 2, the spheres 230 in such systems are randomly dispersed across the exposed face of the solar elements 220. As such, the spheres 230 may closely resemble the granules typically employed with asphalt-based shingles, when the disclosed integrated membrane 200 is used as a replacement for conventional shingles. Such imitation allows solar-powered systems employing a membrane as disclosed herein to more easily blend-in with surrounding conventional asphalt roofs, so as not to draw unwanted attention to the roof of the structure. As a result, passersby viewing an installed system as taught herein will have a difficult time distinguishing a system of the present disclosure and a conventional asphalt-based roof. In addition, current technology allows such photovoltaic spheres 230 to be formed in a variety of colors. Thus, an even more aesthetically pleasing result may be achieved by selecting or customizing specific colors for the spheres 230 comprising the solar elements 220. Of course, a solar-powered system having solar elements 220 constructed as disclosed herein is not limited to the use of photoelectric spheres 230 for the power-generating components on the solar elements 220.

As with the embodiment of FIG. 1, the embodiment illustrated in FIG. 2 also includes a plurality of conductive traces 240 electrically interconnecting the several solar elements 220 dispersed on the members 210A, 210B of the membrane 200. In addition, the members 210A, 210B also include topside electrical interconnects 250 that are electrically coupled to certain ones of the conductive traces 240 and extend from the upper surfaces of the members 210A, 210B in order to contact other portions of the membrane 200. More specifically, this embodiment of the membrane 200 includes multiple members 210A, 210B having a "dragons tooth" shape, but in alternating opposing or complimenting directions. Of course, other shapes may easily be formed without departing from the scope of the present disclosure, as well as any claims issuing therefrom.

Figure 3:
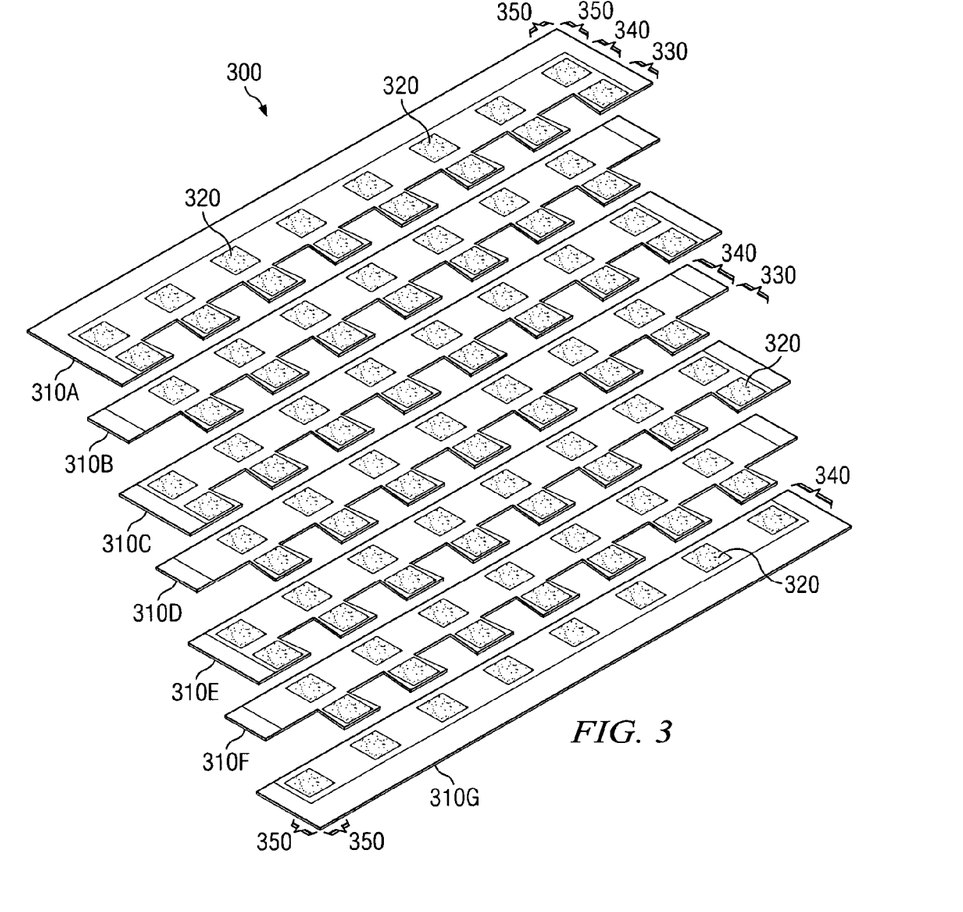
FIG. 3 illustrates an exploded isometric view of another embodiment of an integrated roofing membrane constructed of seven distinct portions.

When employing a dragons tooth shape, each of the members 210A, 210B includes extending portions 260 that extend from a main body 270 of each member 210A, 210B. When such a shape for the members 210A, 210B is employed, the solar elements 220 may be arranged so as to cover only certain parts of the upper surface of both members 210A, 210B, as illustrated, with void areas being free of solar elements 220. Therefore, when the two members 210A, 210B are brought together, for example, during manufacturing of the membrane 200, the extending portions 260 of the first member 210A may be placed over the void areas on the surface of the main body 270 of the second member 210B that do not include solar elements 220. In turn, since the solar elements 220 on the first member 210A may also be placed on only certain areas of its upper surface, the extending portions of a third member (not illustrated) of the membrane 200 may be located over the first member 210A in the same manner, without covering existing solar elements. Of course, the extending portions 260 of the second member 210B of the membrane 200 may then be placed over surface areas of yet another member (not illustrated) of the membrane 200 that do not include solar elements 220. FIG. 3 illustrates the potential to couple many membrane members together to make a single integrated membrane as disclosed herein.

To facilitate the electrical interconnection between the first and second members 210A, 210B of the membrane 200, underside electrical interconnects 280 (not fully visible) are provided. These underside electrical interconnects 280 may be electrically coupled to select ones of the solar elements 220 found on the extending portions 260. Specifically, the underside electrical interconnects 280 extend through the laminate layer (or other beneficial material) providing the substrate for the solar elements 220, and may be electrically coupled to the underside of certain solar elements 220 to complete the electrical circuit. The positioning of the underside interconnects 280 on the underside of the extending portions 260 is selected so that they contact the topside interconnects 250 formed on the upper surface of the main bodies of other membrane members when overlapping. Since the topside interconnects 250 are coupled to the conductive traces 240 dispersed within the members 210A, 210B, which in turn electrically interconnect the solar elements 220, the electrical circuit between two or more members 210A, 210B is completed when the two types of interconnects 250, 280 on the members make contact when overlapping during manufacturing or installation of the membrane 200.

This process of laying the extending portion of one membrane member over areas of the main body of another membrane member, and simultaneously electrically connecting the solar elements in each, may be repeated for any number of membrane members during the manufacturing of the roofing membrane 200, depending on the application. Once no further membrane members are present or required, the underside electrical interconnects extending from the underside of the bottom-most membrane member can provide an easily accessible connection point for electrically coupling the membrane to a photovoltaic system in the building. Such a connection may be made from the last membrane member to a power converter or directly to the structure's electrical breaker box. In an alternative embodiment, the bottom-most membrane member may be manufactured without underside interconnects extending from underneath its solar elements or conductive traces. In such an embodiment, this membrane member may be formed with a straight bottom edge (i.e., not in a dragons tooth pattern), and further conductive traces may be added to extend the entire length of this bottom-most membrane member, if needed. Then, the electrical connections to the photovoltaic system within the building may be made at both ends of this membrane member.

By manufacturing an integrated roofing membrane as described above, a single electrical connection may be made through any number of membrane members by simply laying one member over certain areas of the surface of another member, and without the use of wires between each member along the way. Such interconnections simply continue from membrane member to membrane member until the entire desired area of the roof deck is covered. As a result, external wiring for the system need only be connected to contact pads at the ends of a string of interconnected membrane members. Specifically, if six separate members are combined to create a single membrane, external wires need only be connected to the opposing ends of the upper-most and bottom-most membrane members. Thus, holes for wiring each distinct solar panel, or even each distinct membrane member, to the photovoltaic system need not be made through the roof deck of the building.

Of course, not only does such an integrated membrane eliminate the risk of leaks through the many holes required in conventional systems, but the installation process for the entirety of membrane is substantially simplified. More specifically, the membrane may be manufactured to any desired length (e.g., 100 feet), and may be made using flexible materials. Thus, an extremely long membrane need only be rolled up and an installer need simply unroll the membrane to install it on a roof deck, without the need to drill holes and electrically connect each distinct member of the membrane along the way. Furthermore, in embodiments where the membrane includes an adhesive underlayment, installation is even further simplified since the installer need simply remove any protective backing to expose the adhesive and unroll the membrane onto the roof deck. This approach can eliminate the need for roofing felt or other type of protective paper since the underlayment adheres directly to the roof deck. In any of these embodiments, holes need only be made proximate opposing ends of the membrane (and not between each overlapping member of the membrane) to connect the solar elements to the electrical system of the building.

Looking now at FIG. 3, illustrated is an exploded isometric view of another embodiment of an integrated roofing membrane 300 constructed of seven distinct membrane members 310A-310G. As with the embodiments described above, this embodiment of the membrane 300 also includes multiple solar elements 320 arranged across the upper surfaces of the membrane members 310A-310G. Also as before, the solar elements 320 are electrically interconnected using conductive traces within a laminate layer of the portions 310A-310G, securing the solar elements 320 and to protect the conductive traces from the environment.

In this illustrated embodiment, six of the seven members 310A-310F are again shaped in a dragons tooth pattern. The dragons tooth shape provides some of the solar elements 320 on extending portions 330 that extend from main bodies 340 of the six membrane members 310A-310F. Moreover, every other one of the members 310A-310F have their extending portions 330 offset with respect to an adjacent membrane member (i.e., each membrane member is complimented by each adjacent membrane member). With this offset, the extending portions 330 of each of the membrane members 310A-310F may partially overlap the main body 340 of an adjacent membrane member (and not its extending portions 330) so as to provide an arrangement of the solar elements 320 similar to the arrangement of conventional "tabbed" asphalt roofing shingles (see FIG. 4). As discussed above, as the extending portions 330 of each of the membrane members 31A-310F are lapped over the main body 340 of the next membrane members 310A-310G, underside interconnects (not illustrated) exposed on the underside of the extending portions 330 make electrical contact with topside interconnects (not separately designated) exposed above the surface of the laminate layer of the main bodies 340 to complete the electrical circuit among the several membrane members 310A-310G. As shown, the seventh membrane member 310G does not include extending portions 330 since, in this embodiment, it has not been designed to overlap any further members of the membrane 300.

Also illustrated on the membrane 300 of FIG. 3 are selvage edges 350 along various borders of the individual membrane members 310A-310G. The selvage edges 350 provide "blank" areas of the membrane 300 that allow simple integration with conventional shingles that are to be mounted on the roof deck adjacent the membrane 300. Specifically, in an advantageous embodiment, conventional shingles may be installed to overlap the selvage edges 350 of the membrane 300 to provide both a uniform and aesthetically pleasing integration of the membrane 300 with the rest of the roofing materials, as well as a protective weather barrier provided by the covering of the edges 350 of the membrane 300.

Figure 4:
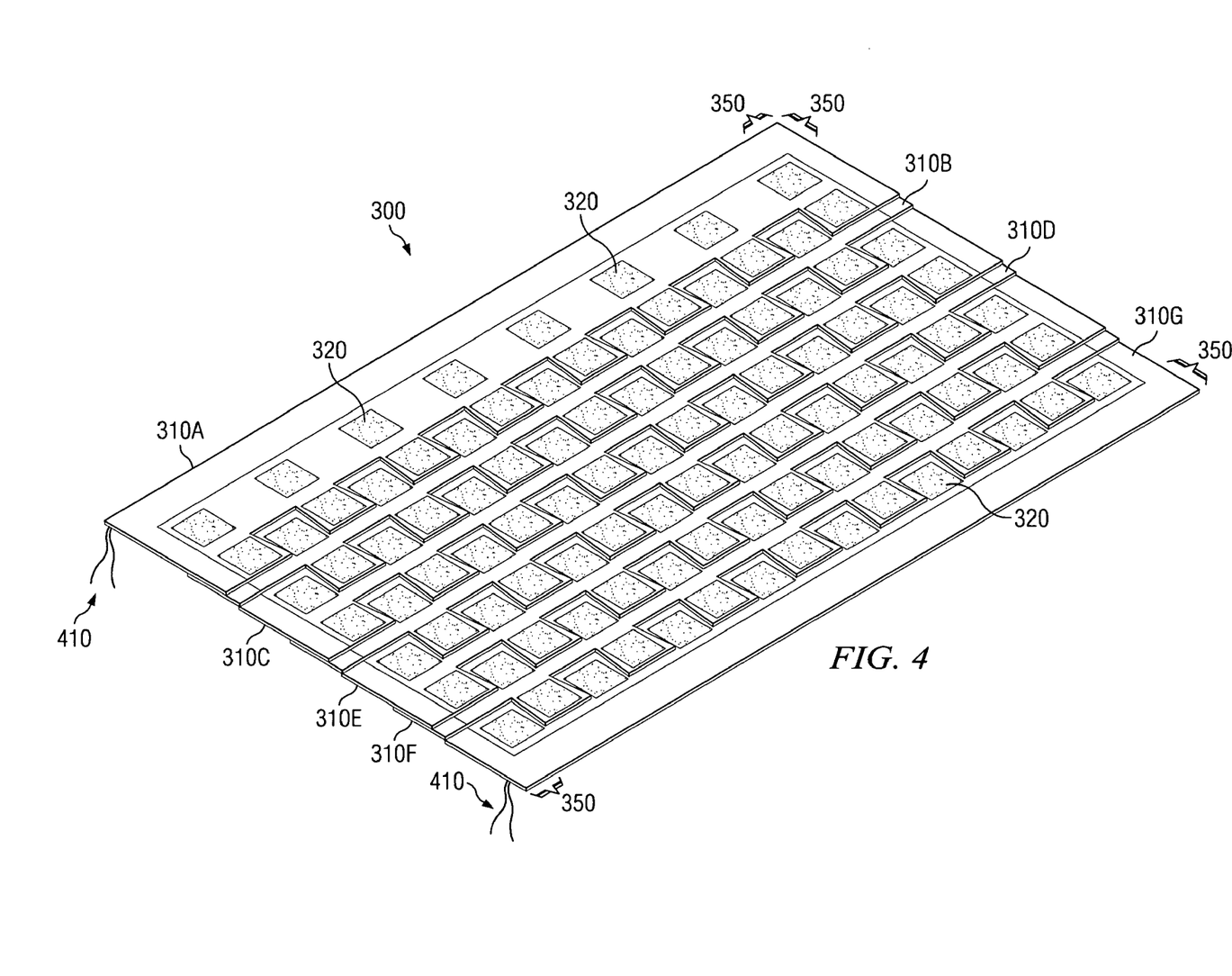
FIG. 4 illustrates an isometric view of the membrane of FIG. 3 after all of the membrane members have been overlapped together.

Turning now to FIG. 4, illustrated is an isometric view of the membrane 300 of FIG. 3 after all of the membrane members 310A-310G have been overlapped together, as described above. As may be seen, by overlapping extending portions 330 of each of the membrane members 310A-310F over areas of adjacent main bodies 340 not having solar elements 320, a "tabbed" appearance for the solar elements 320 across the membrane 300 may be achieved to better integrate (and thus camouflage) the membrane 300 with nearby conventional roofing shingles. In addition, although the solar elements 320 on the upper-most membrane member 310A are illustrated in a spaced arrangement similar to that found on the other members 310B-310G, further solar elements 320 may be added to the open areas on the main body 340 of the first member 310A, since no further member will overlap these areas, in order to provide even further uniform integration.

Also shown in FIG. 4 are wire pairs 410 for use in electrically coupling the completed membrane 400 to the electrical system of the building. As mentioned above, since the solar elements 320 are electrically interconnected within each member 310A-310G and among the multiple members 310A-310G employed, only two pairs of wires 410 are employed for the connection to the building's electrical system. Thus, during the installation process, far fewer wiring holes need to be drilled through the roof deck to connect an integrated membrane of the type disclosed herein. Of course, other embodiments may includes a greater number of wires if desired, especially in applications where the multiple membranes are installed adjacent or proximate each other.

Once installed, the wires 410 are electrically connected to an inverter (or similar circuitry) and then to the electrical breaker box for the building, in order to provide a photovoltaic solar-powered system to supplement or replace the traditional electricity provided by the local utility company. Of course, in other embodiments, the membrane 400 may be wired to a power converter for storage of the electricity generated by the solar elements 320 in electrical storage devices, such as batteries. In either embodiment, the integration of the electrical connections within each membrane member 310A-310G, and between the multiple members used to form the complete membrane 400, provides for both simplified installation and simplified wiring of the photovoltaic system in and on the building.

Also in manufacturing the complete membrane 400, the underlayment (see FIG. 1) may be provided individually for each of the membrane members 310A-310G before the members are overlapped. Alternatively, the membrane members 310A-310G may first be overlapped during the manufacturing process, and then a single underlayment provided for the entire underside of the complete membrane 400. In either embodiment, the completed membrane 400 includes an underlayment across its whole underside, providing protection for the entire portion of the roof deck under the membrane 400, as well as protection from the elements for the few holes created for the wire pairs 410. Of course, a membrane constructed as described herein, as well the process for manufacturing such a membrane, is not limited to either embodiment.

Figure 5:
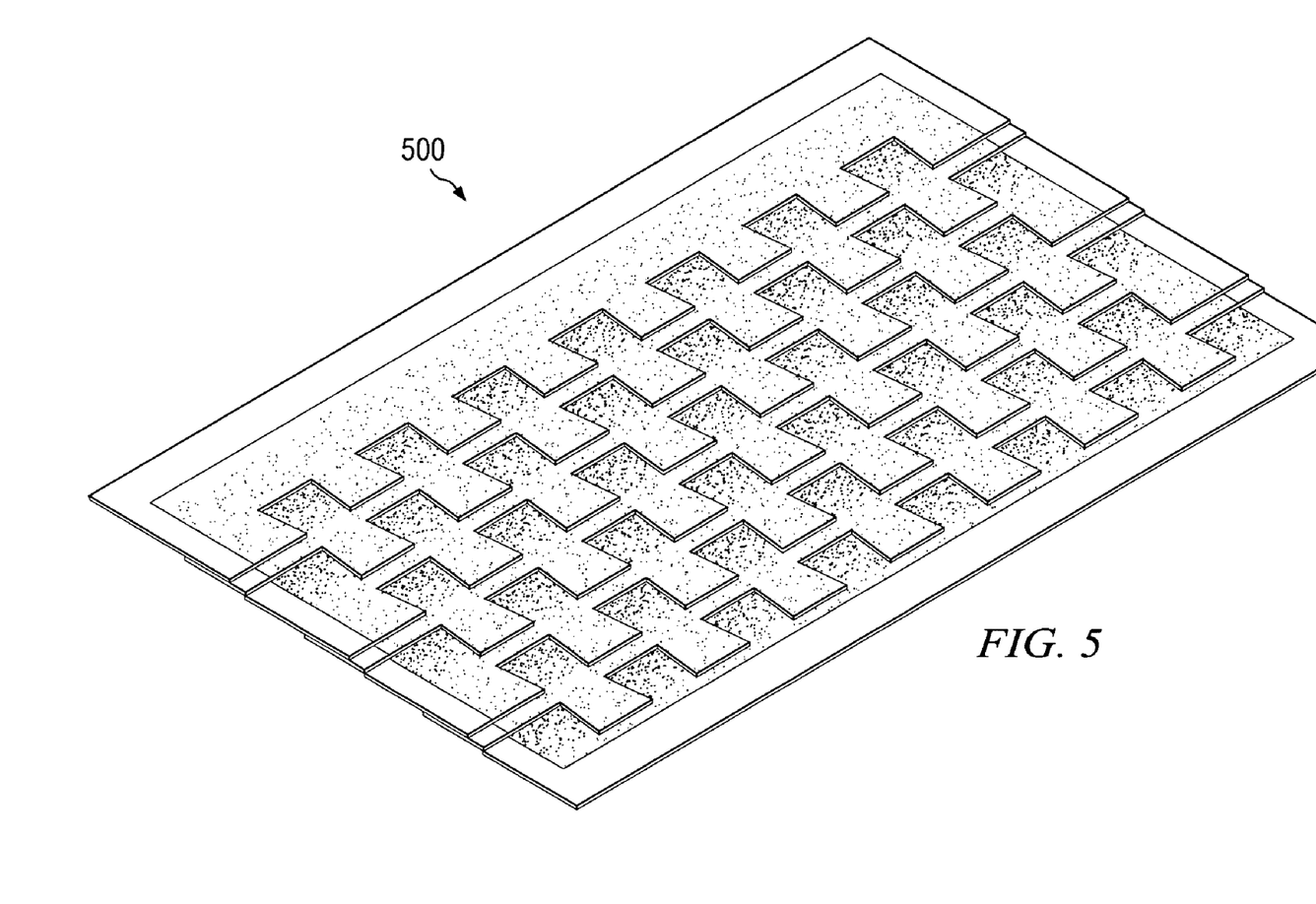
FIG. 5 illustrates another embodiment of a complete photovoltaic roofing membrane having a varying color pattern.

Looking finally at FIG. 5, illustrated is another embodiment of a complete photovoltaic roofing membrane 500 having a varying color pattern. As is well known, conventional asphalt shingles often include several horizontal regions of different colors on their exterior surface to provide visual depth to the entire roof when viewed from a distance. In keeping with such shingles, such horizontal color regions may be included on the solar elements of a membrane constructed as disclosed herein to provide further visual integration, however these are not required. Furthermore, in applications where the entire roof will not or cannot be covered with a photovoltaic membrane of the type disclosed herein, "dummy" portions comprised of materials similar in appearance to the membrane may be employed to complete the assembly and maintain a uniform appearance for the exterior of the membrane in the disclosed photovoltaic system. Specifically, such dummy portions may be manufactured in a manner similar (using similar colors) to the actual functional membrane members, but without the relatively expensive solar elements included.

As is clear from the above disclosure, an integrated photovoltaic roofing membrane has been disclosed. An exemplary embodiment of such a roofing membrane may comprise a first member having a first main body and one or more extending portions coupled to and extending therefrom, a second member having a second main body, and a plurality of electrically interconnected photovoltaic solar elements laterally dispersed on a top surface of the first and second main bodies and on the extending portions. In addition, this embodiment may also include at least one underside electrical interconnect electrically coupled to and extending from an underside of one of the photovoltaic solar elements dispersed on the one or more extending portions. Furthermore, the membrane may include at least one topside electrical interconnect extending from void areas of the second main body free of photovoltaic solar elements, the at least one topside electrical interconnect electrically coupled to at least one of the photovoltaic solar elements dispersed on the second main body, each of the extending portions of the first member coupled to and overlapping the void areas wherein each of the at least one underside interconnects is electrically coupled to corresponding ones of the at least one topside electrical interconnects.

In another embodiment, the roofing membrane further includes an underlayment layer coupled to an underside of the first and second members across the roofing membrane. In a more specific embodiment, the underlayment layer may include an adhesive on a topside and an underside thereof, or alternatively be constructed using materials having self-adhesive properties, where the adhesive on the topside of the underlayment layer facilitates the coupling of the underlayment layer to the underside of the first and second members.

In a further embodiment, the roofing membrane may further include a laminate layer formed over top surface of the first and second members, where the plurality of electrically interconnected photovoltaic solar elements are laterally dispersed within the laminate layer. In a related embodiment, the plurality of photovoltaic solar elements laterally dispersed on the top surface of the first and second main bodies and on the extending portions are electrically interconnected using conductive traces formed within the laminate layer.

In yet another embodiment, the photovoltaic solar elements of the roofing membrane are comprised of photoelectric silicon spheres formed on an electrically conductive base, and in a more specific embodiment, the outer surface of the photovoltaic solar elements have at least one color corresponding to a color of ordinary shingles proximate the roofing membrane. Furthermore, other embodiments may also include selvage edges located along perimeter edges of the first and second members for overlapping by nearby conventional shingles. Also, in order to blend-in with nearby conventional shingles, a plurality of extending portions may be included to form a dragons tooth pattern coupled to and extending from the first main body, which is similar in appearance to the conventional design of asphalt roofing shingles.

In yet a further embodiment, the roofing membrane may further include an electrical connection from a first photovoltaic solar element located proximate a first end of the roofing membrane, and from a second photovoltaic solar element located proximate a second end of the roofing membrane distal the first end, to an electrical system of a building having the roofing membrane. In such an embodiment, only two holes need to be made in the roof deck to electrically connect the membrane. In still another embodiment, the first and second members and the plurality of photovoltaic solar elements of the roofing membrane may be comprised of flexible materials so that the roofing membrane may be rolled for easy transport and installation.

Also, in other embodiments, the roofing membrane may actually include a plurality of the first members, each having at least one topside electrical interconnect extending from void areas of the first main bodies free of photovoltaic solar elements. In such embodiments, the at least one topside electrical interconnect are electrically coupled to at least one of the photovoltaic solar elements dispersed on the first main bodies. Also, each of the extending portions of at least one of the first members are coupled to and overlapping the void areas of the first main bodies of another of the plurality of first members wherein each of the at least one underside interconnects is electrically coupled to corresponding ones of the at least one topside electrical interconnects on the another first member.

While various embodiments of an integrated photovoltaic roofing membrane constructed according to the principles disclosed herein, and related methods of manufacturing such a membrane, have been described above, it should be understood that they have been presented by way of example only, and not limitation. The breadth and scope of the invention(s) should thus not be limited by any of the above-described exemplary embodiments, but should be defined only in accordance with any claims and their equivalents issuing from this disclosure. Moreover, the above advantages and features are provided in described embodiments, but shall not limit the application of such claims to processes and structures accomplishing any or all of the above advantages.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Technical Field," such claims should not be limited by the language chosen under this heading to describe the so-called technical field. Further, a description of a technology in the "Background" is not to be construed as an admission that technology is prior art to any invention(s) in this disclosure. Neither is the "Brief Summary" to be considered as a characterization of the invention(s) set forth in any issuing claims. Multiple inventions are set forth according to the limitations of any claims associated with this disclosure, and such claims accordingly define the invention(s), and their equivalents, that are protected thereby. In all instances, the scope of such claims should not be constrained by the headings set forth herein.

What is claimed is:

1. A flexible roofing membrane, comprising:
   a flexible first member having a first main body extending along a length of the membrane and a plurality of extending portions coupled to and extending therefrom along a width of the membrane perpendicular to the length of the membrane;
   a flexible second member having a second main body extending along the length of the membrane;
   a plurality of electrically interconnected flexible photovoltaic solar elements, some of the plurality dispersed on a top surface of the first and second main bodies and others of the plurality periodically dispersed on the plurality of extending portions of the first member, wherein elements on the extending portions are immediately adjacent along the width of the membrane to corresponding elements dispersed on the main body of the first member thereby providing void areas on the main body of the first member where extending portions do not extend along a width of the membrane; and
   wherein the extending portions of the first member are mounted on a corresponding plurality of void areas of the top surface of the second main body between the photovoltaic solar elements on the second main body such that the main body of the first member is adjacent to the main body of the second member along the length of the membrane without overlapping;
   at least one underside electrical interconnect electrically coupled to and extending from an underside of one of the photovoltaic solar elements dispersed on the plurality of extending portions;
   at least one topside electrical interconnect extending from the void areas of the second main body free of photovoltaic solar elements, the at least one topside electrical interconnect electrically coupled to at least one of the photovoltaic solar elements dispersed on the second main body, wherein each of the at least one underside interconnects is directly under and electrically coupled to corresponding ones of the at least one topside electrical interconnects when the extending portions of the first member are mounted on the corresponding plurality of void areas of the top surface of the second main body between the photovoltaic solar elements on the second main body; and
   wherein at least one of the first member or second member is comprised of a material having adhesive properties.

2. A roofing membrane according to claim 1, wherein the at least one of the first or second member having the adhesive properties comprises a bituminous material.

3. A roofing membrane according to claim 1, further comprising a flexible underlayment layer coupled to an underside of the first and second members across the roofing membrane.

4. A roofing membrane according to claim 3, wherein the underlayment layer comprises a self-adhesive underlayment having a bottom surface capable of adhering to a roofing structure.

5. A roofing membrane according to claim 4, wherein the underlayment layer comprises a bituminous material.

6. A roofing membrane according to claim 1, further comprising a flexible translucent laminate layer formed over the top surface of the first and second members, the plurality of electrically interconnected photovoltaic solar elements dispersed under the laminate layer.

7. A roofing membrane according to claim 6, wherein the plurality of photovoltaic solar elements dispersed on the top surface of the first and second main bodies and on the extending portions are electrically interconnected using conductive traces formed under the laminate layer.

8. A roofing membrane according to claim 1, further comprising selvage edges located along perimeter edges of the first and second members.

9. A roofing membrane according to claim 1, further comprising an electrical connection from a first photovoltaic solar element located proximate a first end of the roofing membrane, and from a second photovoltaic solar element located proximate a second end of the roofing membrane distal the first end, to an electrical system of a building having the roofing membrane.

10. A roofing membrane according to claim 1, wherein the plurality of extending portions comprises a dragons tooth pattern coupled to and extending from the first main body.

11. A roofing membrane according to claim 1, further comprising a plurality of flexible first members, each comprising at least one topside electrical interconnect extending from void areas of the first main bodies free of photovoltaic solar elements, the at least one topside electrical interconnect electrically coupled to at least one of the photovoltaic solar elements dispersed on the first main bodies, each of the extending portions of at least one of the first members coupled to and overlapping the void areas of the first main bodies of another of the plurality of first members, wherein each of the at least one underside interconnects on the extending portions of one first member is electrically coupled to corresponding ones of the at least one topside electrical interconnects on the another first member.

12. A roofing membrane according to claim 1, wherein the photovoltaic solar elements comprise photoelectric silicon spheres formed on an electrically conductive base.

13. A roofing membrane according to claim 1, wherein an outer surface of the photovoltaic solar elements comprise at least one color corresponding to a color of ordinary shingles to be located proximate the roofing membrane.

14. A method of manufacturing a flexible roofing membrane, the method comprising:
   forming a flexible first member having a first main body extending along a length of the membrane and a plurality of extending portions coupled to and extending therefrom along a width of the membrane perpendicular to the length of the membrane;
   forming a flexible second member having a second main body extending along the length of the membrane;
   dispersing periodically some of a plurality of electrically interconnected photovoltaic solar elements on a top surface of the first and second main bodies and others of the plurality on the plurality of extending portions of the first member, wherein elements on the extending portions are immediately adjacent along the width of the membrane to corresponding elements dispersed on the main body of the first member thereby providing void areas on the main body of the first member where extending portions do not extend along a width of the membrane;
   overlapping each of the extending portions of the first member over a corresponding plurality of void areas on the second main body between the photovoltaic solar elements on the second main body such that the main body of the first member is adjacent to the main body of the second member along the length of the membrane without overlapping;
   electrically coupling at least one underside electrical interconnect to and extending from an underside of one of the photovoltaic solar elements dispersed on the plurality of extending portions; and
   electrically coupling at least one topside electrical interconnect to at least one of the photovoltaic solar elements dispersed on the second main body, the at least one topside electrical interconnect extending from void areas of the second main body free of photovoltaic solar elements, wherein the overlapping further comprising overlapping such that each of the at least one underside interconnects is directly under and electrically coupled to corresponding ones of the at least one topside electrical interconnects; and
   wherein forming further comprises forming at least one of the first member or second member using a material having adhesive properties.

15. A method according to claim 14, wherein the forming at least one of the first member or second member using a material having adhesive properties comprises forming at least one of the first or second member using a bituminous material.

16. A method according to claim 14, further comprising coupling a flexible underlayment layer to an underside of the first and second members across the roofing membrane.

17. A method according to claim 16, wherein the underlayment layer comprises a self-adhesive underlayment having a bottom surface capable of adhering to a roofing structure.

18. A method according to claim 17, further comprising coupling an underlayment layer comprises a bituminous material.

19. A method according to claim 14, further comprising forming a flexible translucent laminate layer over the top surface of the first and second members, the plurality of electrically interconnected photovoltaic solar elements dispersed under the laminate layer.

20. A method according to claim 19, further comprising electrically interconnecting the plurality of photovoltaic solar elements dispersed on the top surface of the first and second main bodies and on the extending portions using conductive traces formed under the laminate layer.

21. A method according to claim 14, further comprising forming selvage edges along perimeter edges of the first and second members.

22. A method according to claim 14, further comprising providing an electrical connection from a first photovoltaic solar element located proximate a first end of the roofing membrane, and from a second photovoltaic solar element located proximate a second end of the roofing membrane distal the first end, to an electrical system of a building having the roofing membrane.

23. A method according to claim 14, wherein the plurality of extending portions comprises a dragons tooth pattern coupled to and extending from the first main body.

24. A method according to claim 14, further comprising forming a plurality of flexible first members, each comprising at least one topside electrical interconnect extending from void areas of the first main bodies free of photovoltaic solar elements, the at least one topside electrical interconnect electrically coupled to at least one of the photovoltaic solar elements dispersed on the first main bodies, each of the extending portions of at least one of the first members coupled to and overlapping the void areas of the first main bodies of another of the plurality of first members, wherein each of the at least one underside interconnects on the extending portions of one first member is electrically coupled to corresponding ones of the at least one topside electrical interconnects on the another first member.

25. A method according to claim 14, wherein the dispersing comprises dispersing a plurality of electrically interconnected photovoltaic solar elements comprising photoelectric silicon spheres formed on an electrically conductive base.

26. A method according to claim 14, wherein the dispersing comprises dispersing a plurality of electrically interconnected flexible photovoltaic solar elements each having an outer surface comprising at least one color corresponding to a color of ordinary shingles to be located proximate the roofing membrane.

* * * * *